United States Patent
Siddiqui et al.

(10) Patent No.: US 9,676,395 B2
(45) Date of Patent: Jun. 13, 2017

(54) INCAPACITATED DRIVING DETECTION AND PREVENTION

(71) Applicant: Ford Global Technologies, LLC, Dearborn, MI (US)

(72) Inventors: Adil Nizam Siddiqui, Farmington Hills, MI (US); Jeffrey Allen Greenberg, Ann Arbor, MI (US); Brad Alan Ignaczak, Canton, MI (US); Patrick Kevin Holub, Novi, MI (US); John Robert Van Wiemeersch, Novi, MI (US); Gary Steven Strumolo, Canton, MI (US); Pramita Mitra, Southfield, MI (US); David Melcher, Ypsilanti, MI (US); Mark A. Cuddihy, New Boston, MI (US); Craig John Simonds, Dearborn, MI (US); Ali Hassani, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/927,722

(22) Filed: Oct. 30, 2015

(65) Prior Publication Data

US 2017/0120929 A1    May 4, 2017

(51) Int. Cl.
*B60J 7/22* (2006.01)
*F16H 59/50* (2006.01)
(Continued)

(52) U.S. Cl.
CPC ............ *B60W 50/085* (2013.01); *G06F 3/011* (2013.01); *G06F 21/32* (2013.01); *B60W 2050/0014* (2013.01); *B60W 2540/26* (2013.01)

(58) Field of Classification Search
CPC ....... B60W 50/085; B60W 50/08; B60Q 9/00; A61B 5/0205; G07C 5/12; B60J 7/22;
(Continued)

(56) References Cited

U.S. PATENT DOCUMENTS

| | | | |
|---|---|---|---|
| 4,829,434 A | * | 5/1989 | Karmel .................. F16H 59/50 477/129 |
| 7,488,294 B2 | | 2/2009 | Torch |

(Continued)

FOREIGN PATENT DOCUMENTS

| | | |
|---|---|---|
| AU | 200022710 B2 | 8/2000 |
| CN | 102848918 | 1/2013 |

(Continued)

OTHER PUBLICATIONS

UK Search Report dated Apr. 7, 2017 (4 pages).

*Primary Examiner* — Yuri Kan
(74) *Attorney, Agent, or Firm* — Frank A. MacKenzie; Bejin Bieneman PLC

(57) ABSTRACT

Biometric data is received from a wearable device. The biometric data concerns a vehicle operator measured by at least one sensor in the wearable device. A load score is determined. The load score is a measurement of operator capacity to operate the vehicle based at least in part on the biometric data from the wearable device. At least one vehicle component is actuated based at least in part on the load score.

19 Claims, 4 Drawing Sheets

(51) Int. Cl.
  B60W 50/08 (2012.01)
  G06F 3/01 (2006.01)
  G06F 21/32 (2013.01)
  B60W 50/00 (2006.01)
(58) Field of Classification Search
  CPC ........ H04M 3/5232; H04M 1/67; H04N 7/18;
          F16H 59/50; B60G 17/0195; B60K 6/48;
          F01N 3/021; B60R 25/04; G08G 1/052
  See application file for complete search history.

(56) References Cited

U.S. PATENT DOCUMENTS

| | | | |
|---|---|---|---|
| 8,698,639 B2 | 4/2014 | Fung et al. | |
| 8,725,311 B1 | 5/2014 | Breed | |
| 9,373,203 B1* | 6/2016 | Fields | G07C 5/12 |
| 2003/0006886 A1* | 1/2003 | Gabbard | B60R 25/04 340/425.5 |
| 2007/0245721 A1* | 10/2007 | Colignon | F01N 3/021 60/288 |
| 2008/0027337 A1 | 1/2008 | Dugan et al. | |
| 2009/0069953 A1* | 3/2009 | Hale | B60W 50/08 701/1 |
| 2010/0198606 A1* | 8/2010 | Gherardi | G08G 1/052 705/1.1 |
| 2010/0222959 A1* | 9/2010 | Murata | B60G 17/0195 701/31.4 |
| 2012/0212353 A1 | 8/2012 | Fung et al. | |
| 2013/0118593 A1* | 5/2013 | Wright | B60K 6/48 137/2 |
| 2013/0311043 A1* | 11/2013 | Kobana | B60J 7/22 701/41 |
| 2014/0028848 A1* | 1/2014 | Takenaka | H04N 7/18 348/148 |
| 2014/0266739 A1 | 9/2014 | Chen | |
| 2015/0120124 A1 | 4/2015 | Bartels et al. | |
| 2015/0203063 A1* | 7/2015 | Koehler | A61B 5/0205 701/36 |
| 2016/0042627 A1* | 2/2016 | Foley | B60Q 9/00 340/576 |
| 2016/0286047 A1* | 9/2016 | Matula | H04M 3/5232 |

FOREIGN PATENT DOCUMENTS

| | | |
|---|---|---|
| EP | 2937844 A1 | 10/2015 |
| GB | 2320972 A | 7/1998 |
| WO | 0044580 | 8/2000 |

\* cited by examiner

INCAPACITATED DRIVING DETECTION AND PREVENTION

BACKGROUND

Vehicle operators who are incapacitated, e.g., from stress and/or a lack of energy, e.g., being drowsy, tired, sleepy, etc., are a cause for concern, e.g., for operators in surrounding vehicles and for near-by pedestrians. Predicting the onset of incapacity is difficult and once incapacitated, an operators may not recognize the incapacity. Preventing incapacity may therefore be all but impossible for the vehicle operator. Operators in surrounding vehicles, and near-by pedestrians, are typically unaware of risks of a vehicle operator's incapacity.

DETAILED DESCRIPTION

Introduction

Figure 1:
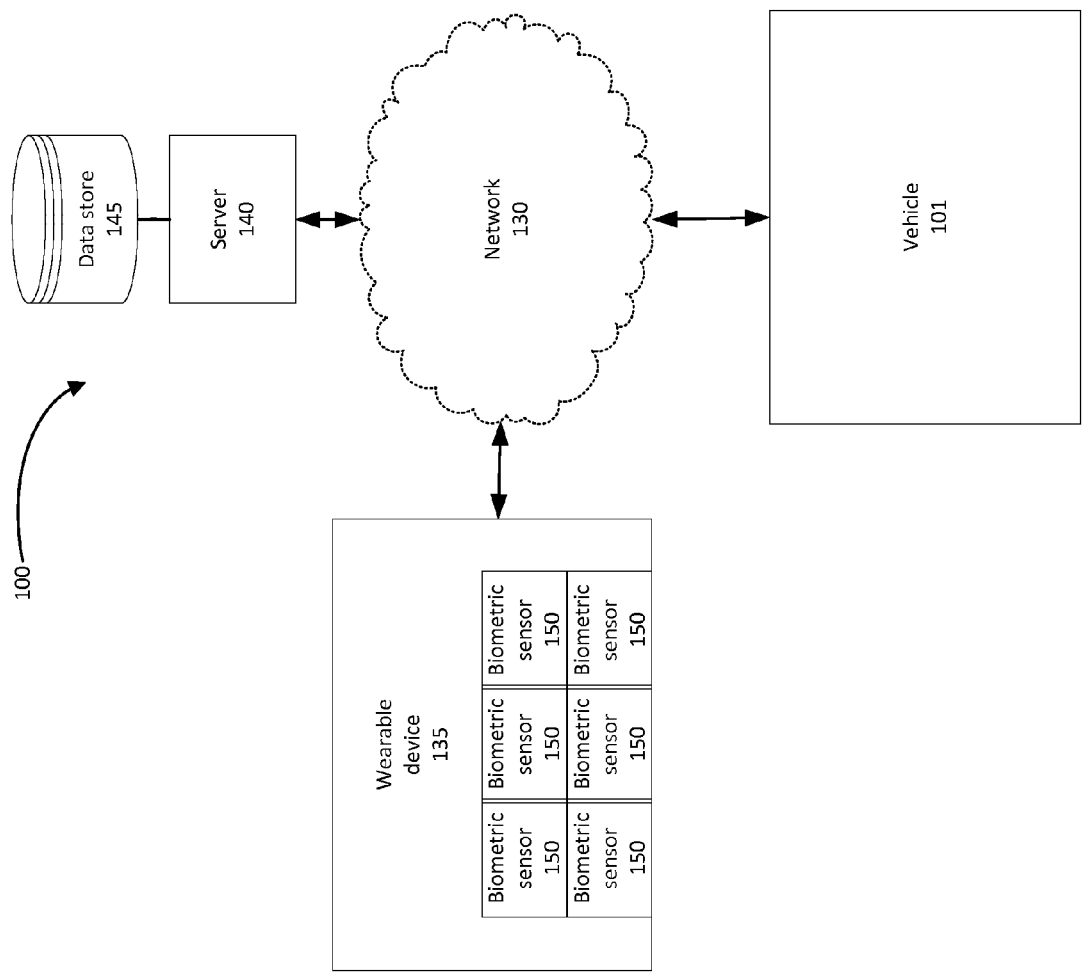
FIG. 1 illustrates an exemplary vehicle system for detecting and preventing an incapacitated operator from operating a vehicle.
Figure 2:
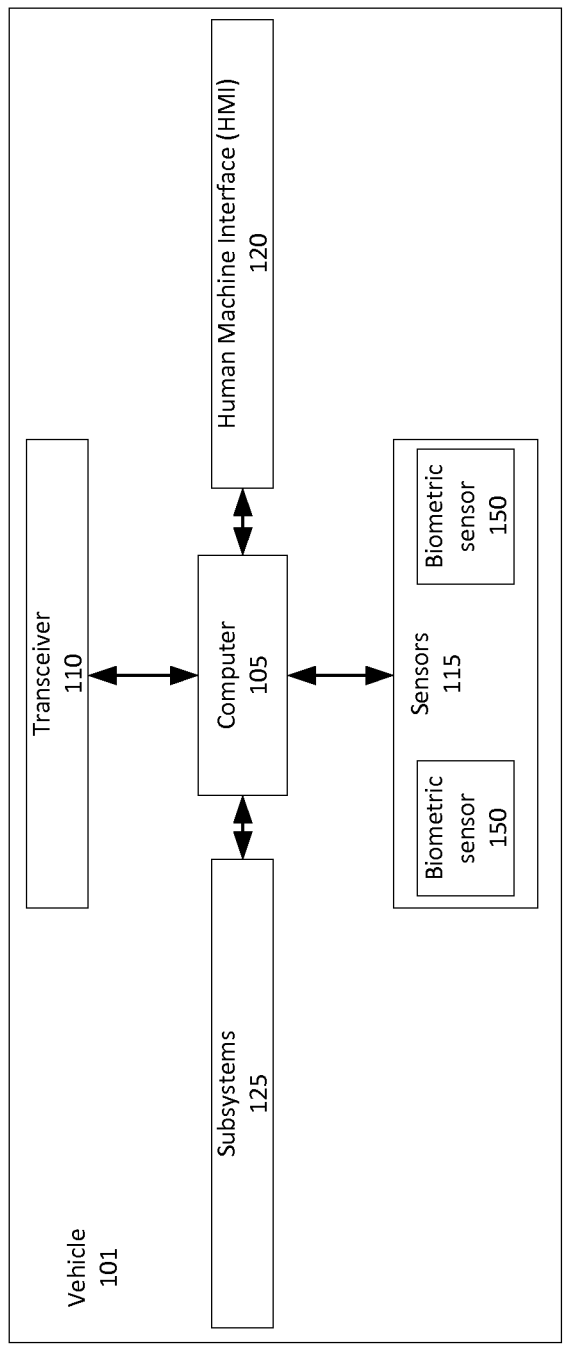
FIG. 2 illustrates an exemplary vehicle system.

FIGS. 1 and 2 are block diagrams of an exemplary vehicle 101 system 100 for incapacitated driving detection and prevention. A vehicle 101 may include a computer 105 that includes or is communicatively coupled to a transceiver 110, sensors 115, a human machine interface (HMI) 120, and/or vehicle 101 subsystems 125, e.g., steering, brakes, throttle, etc. The computer 105 may receive and control data relating to operating the vehicle 101. The computer 105 is communicatively coupled with a network 130. The network 130 is communicatively coupled to a wearable device 135 and to a server 140. The server is communicatively coupled to a data store 145.

The vehicle 101 computer 105 may be programmed to determine that an operator of the vehicle 101 is incapacitated, e.g., due to heightened stress levels and/or due to a lack of energy, e.g., is drowsy, is tired, is sleepy, etc., and for deciding what actions, if any, to actuate, e.g., to actuate one or more vehicle components such as brakes, throttle, or steering. The vehicle 101 computer 105 monitors biometric data of the operator to evaluate the operator and, determine that the operator is incapacitated. Should the vehicle 101 computer 105 determine that the operator is incapacitated, the vehicle 101 computer 105 may include programming to actuate one or more components in the vehicle 101, device 135, etc.; different actions may be actuated depending on a level or type of incapacity that has been determined. Actions may include, for example, various actuations of one or more vehicle 101 components such as steering, brakes, throttle, etc.

Exemplary System Elements

The vehicle 101 typically includes a computer 105. The computer 105 may be communicatively coupled to, e.g., via a communications bus or other known wired or wireless connections, or the computer 105 may include, one or more electronic control units, e.g., controllers or the like included in the vehicle 101 for monitoring and/or controlling various vehicle 101 components, e.g., an engine control unit (ECU), transmission control unit (TCU), etc. The computer 105 may be generally configured for communications on a controller area network (CAN) bus or any other suitable protocol such as JASPAR, LIN, SAE J1850, AUTOSAR, MOST, etc. Electronic control units may be connected to, e.g., the CAN bus, as is known. The vehicle 101 may also include one or more electronic control units specifically for receiving and transmitting diagnostic information such as an onboard diagnostics connector (OBD-II). Via the CAN bus, OBD-II, and/or other wired or wireless mechanisms, the computer 105 may transmit messages to various devices in the vehicle 101 and/or receive messages from the various devices, e.g., controllers, actuators, etc. Alternatively or additionally, in cases where the computer 105 actually comprises multiple devices, the CAN bus or the like may be used for communications between devices represented as the computer 105 in this disclosure, e.g., various ECUs.

The vehicle 101 may include a transceiver 110. The transceiver 110 may transmit and/or receive messages to and/or from the vehicle 101. The transceiver 110 may transmit and/or receive messages using a plurality of communication protocols. For example, the transceiver 110 may transmit and/or receive messages using protocols such as Dedicated Short Range Communication (DSRC), cellular modem, and short-range radio frequency. The transceiver 110 may be in communication with the computer 105 in a known manner, such that the computer 105 can provides messages for transmission to, and receive messages received by, the transceiver 110.

The transceiver 110 may transmit and/or receive kinematic data, i.e., data relating to motion, regarding vehicles surrounding the vehicle 101. For example, the kinematic data may include the velocity of each of the vehicles surrounding the vehicle 101, including the velocity of the vehicle 101. The kinematic data may further include trajectory data, e.g., an acceleration, a steering angle, and/or a path history, of one or more vehicles near, e.g., with a predetermined radius such as ten meters, fifty meters, etc., of the vehicle 101.

The transceiver 110 may communicate with a network 130 that extends outside of the vehicle 101, e.g., communicating with the server 140. The network 130 may include various wired and/or wireless networking technologies, e.g., cellular, Bluetooth, wired and/or wireless packets, etc. The network 130 may have any suitable topology. Exemplary communication networks include wireless communication networks (e.g., using Bluetooth, IEEE 802.11, etc.), local area networks (LAN), and/or wide area networks (WAN), including the Internet, providing data communication services.

The vehicle 101 may include a variety of sensors 115. The sensors 115 may be linked to electronic control units and operate within a CAN bus protocol or any other suitable protocol, as described above. The sensors 115 may both transmit and receive data. The sensors 115 may communicate with the computer 105 or other electronic control unit via e.g., the CAN bus protocol, to process information transmitted from or received by the sensors 115. The sensors 115 may communicate with the computer 105 or other electronic control unit via any suitable wireless and/or wired manner. The sensors 115 may include any assortment of a camera, a RADAR unit, a LADAR unit, a sonar unit, a breathalyzer, a motion detector, etc. Additionally, the sensors 115 may include a global positioning system (GPS)

receiver that may communicate with a global positioning system satellite connected to the network, etc.

The sensors 115 may further include one or more biometric sensors 150, i.e., devices that measure bodily functions. For example, the plurality of biometric sensors 150 may be a heart rate monitor, e.g., that uses photoplethysmography, that measures facial color changes, etc., a pupil size and stability monitor, e.g., such as a pupilometer, etc., and/or a respiration monitor, e.g., that measures acoustic signals, temperature variations near the nostrils, changes in $CO_2$ levels in the vehicle 101, etc. The biometric sensors 150 may use, for example, a camera in the vehicle 101 and/or the vehicle 101 computer 105. Other examples of biometric sensors 150 are possible.

The biometric sensors 150 may be disposed in the vehicle 101 in any suitable location. For example, the heart rate monitor may be disposed within the vehicle 101 steering wheel, the pupil size and pupil stability monitor may include the camera disposed, for example, on or in the vehicle 101 dash board, and the respiratory monitor may be disposed within and/or on the vehicle 101 seatbelt.

The vehicle 101 computer 105 may include one or more memory devices. The memory device may include a main memory device, i.e., a volatile memory device, and/or an auxiliary storage device that may be internal or external to the rest of the computer, e.g., an external hard drive. The memory device may communicate with the computer 105 and may store the data transmitted over the CAN bus protocol by the electronic control units. Individual data may be collected by the sensors 115, but subsequently, the aggregate data may be processed together by the computer 105. Data may also include data calculated and processed as an output by the computer 105. In general, data may include any data that may be gathered by a sensor 115 and/or processed by the computer 105.

The vehicle 101 may include a human machine interface (HMI) 120. The HMI 120 may allow an operator of the vehicle 101 to interface with the computer 105, with electronic control units, etc. The HMI 120 may include any one of a variety of computing devices including a processor and a memory, as well as communications capabilities. The HMI 120 may be a portable computer, tablet computer, mobile phone, e.g., a smart phone, etc., that includes capabilities for wireless communications using IEEE 802.11, Bluetooth, and/or cellular communications protocols, etc. The HMI 120 may further include interactive voice response (IVR) and/or a graphical user interface (GUI), including e.g., a touchscreen or the like, etc. The HMI 120 may communicate with the network 130 that extends outside of the vehicle 101 and may communicate directly with the computer 105, e.g., using Bluetooth, etc.

The vehicle 101 may include one or more subsystems 125. The subsystems 125 may include a brake system, a suspension system, a steering system, and a powertrain system. The subsystems may communicate with the computer 105, e.g., through the electronic control units and/or via the CAN bus protocol. The subsystems 125 may transmit and/or receive data from the computer 105, the sensors 115, the transceiver 110, and/or the HMI 120.

The network 130 may be communicatively coupled to one or more wearable computing devices 135, e.g., Apple watch, Microsoft Band, Google Glass, etc. The wearable device 135 may include any one of a variety of computing devices including a processor and a memory, as well as communications capabilities, e.g., using IEEE 802.11, using Bluetooth, using cellular communications protocols, etc. The wearable device 135 may communicate directly with the vehicle 101 computer 105, e.g., using Bluetooth, etc. The wearable device 135 may communicate with the operator through tactile, visual, auditory, etc. mechanisms.

The vehicle 101 computer 105 and/or the server 140 may be programmed to recognize, e.g., to identify, an operator and/or the wearable device 135 of the operator using stored parameters, e.g., using face recognition or other known techniques enabled by the sensors 150. Biometric data corresponding to a specific operator and representing a baseline, described below, may be stored in the vehicle 101 computer 105 memory, the wearable device 135 memory, and/or in the data store 145.

The wearable device 135 may include some or all of the aforementioned biometric sensors 150. Any suitable biometric sensor 150 may be included in the wearable device 135.

The server 140 may include a data store 145. Data received from the plurality of biometric sensors 150, for example, and data processed by the vehicle 101 computer 105 may be stored in the data store 145 for later retrieval. Additionally, the data store 145 may include an action database, though the vehicle 101 computer 105 memory may alternatively include the action database. In any case, the action database may include a plurality of vehicle 101 and/or wearable device 135 actions, i.e., processes and tasks commenced and regulated by the process 300 that relate to vehicle 101 functions, e.g., braking, navigating, activating headlights, etc., and to vehicle-operator interactions, e.g., changing a radio station, sending alerts to the wearable device 135, modifying climate conditions, etc. Thus, the action database may identify components that may be actuated, along with possible actions for each component, e.g., increasing brake pressure by a predetermined amount or amounts, increasing or decreasing throttle by some increment, changing a steering angle by some amount, etc.

Exemplary Process Flows

Figure 3:
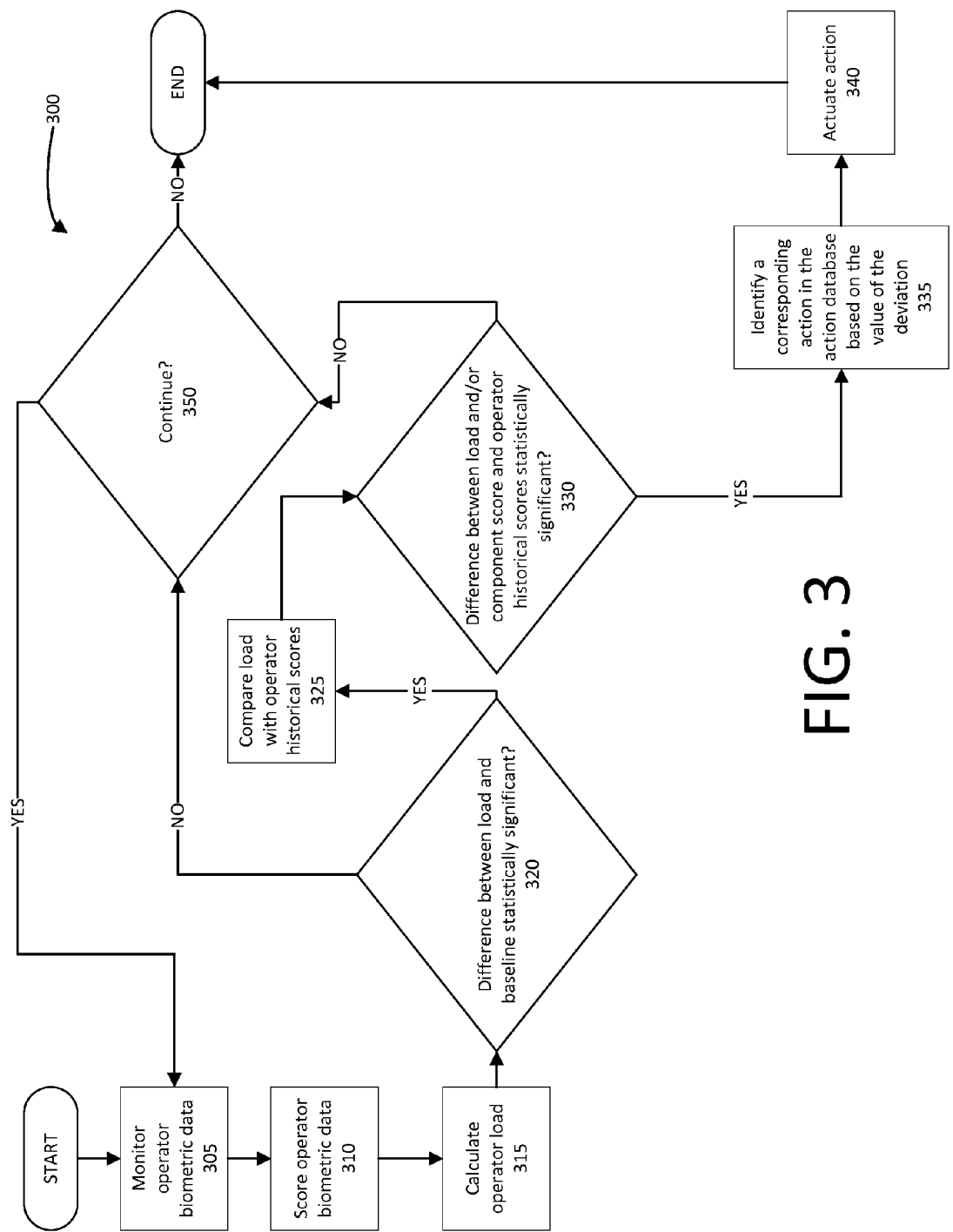
FIG. 3 is a diagram of an exemplary process for detecting and preventing an incapacitated operator from operating a vehicle.

FIG. 3 is a diagram of an exemplary process 300 that may be implemented in the vehicle 101 computer 105 for determining that an operator is incapacitated and for actuating one or more actions.

The process 300 begins in a block 305. In the block 305, a plurality of biometric sensors 150, e.g., disposed within the vehicle 101 and/or the wearable device 135, monitors body characteristics (BC) of the operator. The measured body characteristics may include, for example, a heart rate, a pupillary size, a blink rate, and/or a respiration rate of the operator as an indication of operator incapacity. For example, decreased heart rate, stable pupil size, and decreased respiration rate of the operator may indicate that the operator is drowsy, tired, sleepy, etc. Additionally, increased heart rate, pupillary dilation, and increased respiration rate of the operator may indicate that the operator is stressed. The biometric sensors 150 may measure any other suitable body characteristic of the operator, such as eye movement, i.e., gaze detection, etc.

The wearable device 135 or the vehicle 101 HMI 120 may also prompt the operator to input personal data that may be used to assess operator capacity/incapacity. For example, the wearable device 135 or the vehicle 101 HMI 120 may prompt the operator to enter a number of hours of sleep the operator has had in the past 24 hours.

Next, in a block 310, the data measured by the biometric sensor 150 is received and scored by the vehicle 101 computer 105 and/or by the wearable device 135 computer. For example, as shown in Table 1, the body characteristic measured can be assigned a score (S), e.g., one, two, or three, etc., depending on a value of the body characteristic that the vehicle 101 computer 105 and/or the wearable device 135 computer determines.

As shown in Table 1, the score of each of the body characteristics depends on a status of the body characteristic, the status being assigned according to a value of the characteristic. For example, the heart rate may have a high status if above a first threshold, a normal status if at or below the first threshold and above a second threshold, or a low status if at or below the second threshold. The high status may be defined, for example, as greater than 100 beats per minute (BPM), the normal status may be defined as between 60 BPM and 100 BPM, and the low status may be defined as lower than 60 BPM.

TABLE 1

| BODY CHARACTERISTIC (BC) | STATUS | SCORE (S) | WEIGHTING FACTOR (WF) | COMPONENT SCORE (CS) |
|---|---|---|---|---|
| HEART RATE | HIGH | 3 | 3 | 9 |
|  | NORMAL | 0 |  | 0 |
|  | LOW | 1 |  | 3 |
| HOURS OF SLEEP IN THE PAST 24 HOURS | HIGH | 0 | 2 | 0 |
|  | NORMAL | 0 |  | 0 |
|  | LOW | 3 |  | 6 |
| PUPIL SIZE (CORRECTED FOR OUTDOOR BRIGHTNESS) | LARGE | 3 | 1 | 3 |
|  | NORMAL | 0 |  | 0 |
|  | SMALL | 0 |  | 0 |
| PUPIL STABILITY | STABLE | 0 | 2 | 0 |
|  | UN-STABLE | 2 |  | 4 |

Status definitions of respective body characteristics may vary depending on the operator, e.g., according to age, gender, and/or other personal characteristics. For example, while a high status heart rate for a first operator may be greater than 100 BPM, a second operator may have a high status heart rate at greater than 90 BPM.

Table 1 also includes a weighting factor (WF). The weighting factor may be a pre-determined constant value, e.g., 1, 2.5, etc., stored in the vehicle 101 computer 105 memory and/or the wearable device 135 computer memory or, alternatively, the weighting factor may depend from a plurality of sources. For example, clinical data, i.e., data relating to the health of the operator, e.g., from electronic health records, insurance claims data, disease registries, etc., and/or operator input data, i.e., data, e.g., relating to the health of the operator, that the operator inputs into the vehicle 101 computer 105 via, e.g., the HMI 120, may influence the value of the weighting factor. For example, a first operator whose clinical data includes a diagnosis of heart disease and/or who inputs in the vehicle 101 HMI 120 an indication of heart disease may have a heart disease weighting factor greater than a second operator with a substantially healthy heart.

A component score (CS), as shown in Table 1, may be calculated from the score and the weighting factor according to a component score formula: $CS_{BC}=(WF)_{BC}(S)_{BC}$, in which the value of each of the component score, weighting factor, and score is of the respective body characteristic BC.

Next, in a block 315, the vehicle 101 computer and/or the wearable device 135 computer determines an operator load score, which is a measurement or indicia of operator capacity and/or incapacity for operating the vehicle 101, using a formula based on the respective scores of the body characteristics measured and assigned statuses as described above. The formula may weigh some or all of the scores differently, e.g., using the weighting factor (WF), as shown in Table 1 and described above. For example, as shown in Table 1, the heart rate may be weighted by a factor of 3, the number of hours of sleep in the past 24 hours and pupil stability may be weighted by a factor of 2, and pupil size may be weighted by a factor of 1. The resulting component scores are subsequently combined in the formula. The formula may be, for example, $$\text{load} = k \sum_{BC=1}^{BC=n} (WF_{BC})(S_{BC}),$$

in which k is any constant, WF is the weighting factor, S is the score, BC is the body characteristic, e.g., heart rate, respiration, etc., where each body characteristic is assigned a number, e.g., heart rate=1, respiration rate=2, etc., and n is the maximum number of body characteristics being measured. However, substitutions or variations are possible for determining the load.

Next, in a block 320, the vehicle 101 computer 105 and/or the wearable device 135 computer compares the load with baseline values. The baseline values, e.g., heart rate, respiration rate, etc., for an operator are established from the biometric data of the operator under a predetermined set of conditions, e.g., when the operator is not incapacitated, when the operator is in a resting state, etc., or possibly from other data, such as data pertaining to a demographic category (e.g., age, gender, etc.) to which the operator belongs. To achieve or enhance statistical accuracy, the biometric sensors 150 may, for example, repeatedly measure the status of the operator and compute whether there is a statistically significant deviation from the baseline defined as passing a statistical test comparing the load with the baseline, e.g., a t-test having a p-value (that term being used herein as ordinarily used in the field of statistics, e.g., a probability of achieving observed results) less than a threshold level, i.e., a significance level, e.g., 0.1 or 0.5.

In determining which of the repeated measurements are computed in the load score, the vehicle 101 computer 105 and/or the wearable device 135 computer may account for a different time and/or environment of two or more measurements. For example, a first measurement may occur during environmental conditions, e.g., rain, traffic, nighttime, etc., different than the conditions of a second measurement. Similarly, a third measurement at a first time may occur during identical conditions to a fourth measurement at a second time, yet beyond an acceptable temporal range, i.e., the elapsed time between two measurements, as determined, e.g., by a pre-determined constant, i.e., one year, two years, etc., or by operator input via the HMI 120. Based on at least partly on the changing time and environment of the measurements, the vehicle 101 computer 105 and/or wearable device 135 computer may determine which measurements are included as inputs in the load formula.

Should the load be statistically significantly deviated, i.e., one or more standard deviations, from the baseline, the process 300 proceeds to a block 325. Otherwise, the process 300 proceeds to a block 350. If the load is statistically significantly deviated from the baseline, i.e., passing a statistical test comparing the load with the baseline, e.g., a t-test having a p-value less than a threshold level, i.e., a significance level, e.g., 0.1 or 0.5, the vehicle 101 computer 105 and/or the wearable device 135 computer, in the block 325, compares the load with operator historical scores (OHS). The OHS include component and load scores previously determined by the vehicle 101 computer 105 and/or the wearable device 135 computer and stored in the data store 145.

The OHS may be stored in the data store 145 corresponding to events, e.g., driving in traffic, driving in specific weather, driving near a large number of pedestrians, driving at night, stopping at a railway crossing, driving on the highway, etc. The events may further be defined by, for example, a specific day of the month or season of the year or cyclical occurrence, e.g., tax reporting term, etc. The events may be measured by, e.g., the vehicle 101 sensors 115 and sent to the data store 140 for storage corresponding to the OHS. The data store 145 may include many OHS, each of which may correspond to different events.

In a block 330, the vehicle 101 computer 105 and/or the wearable device 135 computer determines whether the difference between the load and/or the component scores and a related OHS, i.e., the OHS corresponding to a same or substantially similar event occurring during the computing of the load and the component scores, is statistically significant, i.e., passing a statistical test comparing the load with the baseline, e.g., a t-test having a p-value less than a threshold level, i.e., a significance level, e.g., 0.1 or 0.5. If the difference between the load and/or component scores and the corresponding OHS is statistically significant, then the process 300 proceeds to a block 335. Otherwise, the process 300 proceeds to the block 350.

Should the difference between the load and/or the component scores and the related OHS be statistically significant, the vehicle 101 computer 105 and/or the wearable device 135 computer, in the block 335 matches to an action database the value of the deviation of the value of the computed operator load and/or component scores from the value of the OHS. The value of the deviation represents the degree to which the load and/or component scores are different than the OHS. The value of the deviation may be calculated by formula, e.g., by dividing the load and/or component scores by the related OHS. For example, a load score of 8 and an OHS of 2 for a first operator may result in a deviation value of 4, whereas a load score of 6 and an OHS of 3 for a second operator may result in a deviation value of 2, suggesting that the first operator may be more incapacitated than the second operator.

Next, in a block 340, the vehicle 101 computer 105 based on the value of the deviation, identifies a corresponding action in the action database.

Deviation values may be modified based on environmental and vehicle 101 data, e.g., rain, fog, traffic, vehicle 101 speed, etc., that may be detected by the vehicle 101 sensors 115 or from the server 140, for example. Deviation values may be increased to account for, e.g., reduced operator visibility in fog or reduced operator response time at high speed and/or in traffic. The value of increase in deviation values may depend on the severity and number of the environmental and vehicle 101 data present. For example, traveling at high speeds in fog may increase the deviation value more than traveling at high speeds without fog. Similarly, for further example, a severe thunderstorm may increase the deviation value more than a light shower. As described above, deviation values are associated with actions, and, therefore, environmental and vehicle 101 data may influence the manner in which the computer 105 takes control of the vehicle 101 components and/or operations.

For example, a first value of deviation, corresponding to a first operator, that is greater than a second value of deviation, corresponding to a second operator, suggests that the first operator is experiencing a higher driving load than the second operator and that the vehicle 101 and/or wearable device 135 will actuate a first action based on a first formula in the action database corresponding to the first load value that is different from a second action based on a second formula in the action database corresponding to the second load value.

Once the vehicle 101 computer 105 matches the value of deviation with the corresponding function in the action database, the vehicle 101 and/or wearable device 135, in a block 345, executes the function to bring about the action. For example, the wearable device 135 and/or the vehicle 101 may alert, e.g., by visual stimuli, auditory stimuli, tactile stimuli, etc., the vehicle 101 operator to prevent incapacitation. Additionally or alternatively, the vehicle 101 may prompt the operator to change the vehicle 101 mode, i.e., from manual control to part or full control by the computer 105, and/or the vehicle 101 may automatically change the vehicle 101 mode. The computer 105 may control some or all of the vehicle 101 components and/or operations depending on the deviation value. For example, a high deviation value, suggesting that the operator is severely incapacitated, may correspond to the computer 105 controlling a greater number of vehicle 101 components and/or operations than if the deviation value were lower. For example, a high driver load, leading to a high deviation value, may result in the computer 105 stopping the vehicle 101. For further example, a high deviation value may result in the computer 105 controlling the steering, acceleration, and navigation aspects of the vehicle 101. Alternatively, a low driver load, leading to a low deviation value, may result in the computer 105 taking minimal control of the vehicle 101 components and/or operations. For example, a low driver load may correspond to the vehicle 101 computer 105 prompting the operator or sending an alert to the wearable device 135 to alert the operator.

Next or following from either the block 320 or the block 330, in the block 350, the vehicle 101 computer 105 determines whether the process 300 should continue. For example, the process 300 may end if the vehicle 101 turns off the process 300, if the vehicle 101 is switched off, etc. In any case, if the process 300 should not continue the process 300 ends following the block 350. Otherwise, the process 300 returns to the block 305.

Figure 4:
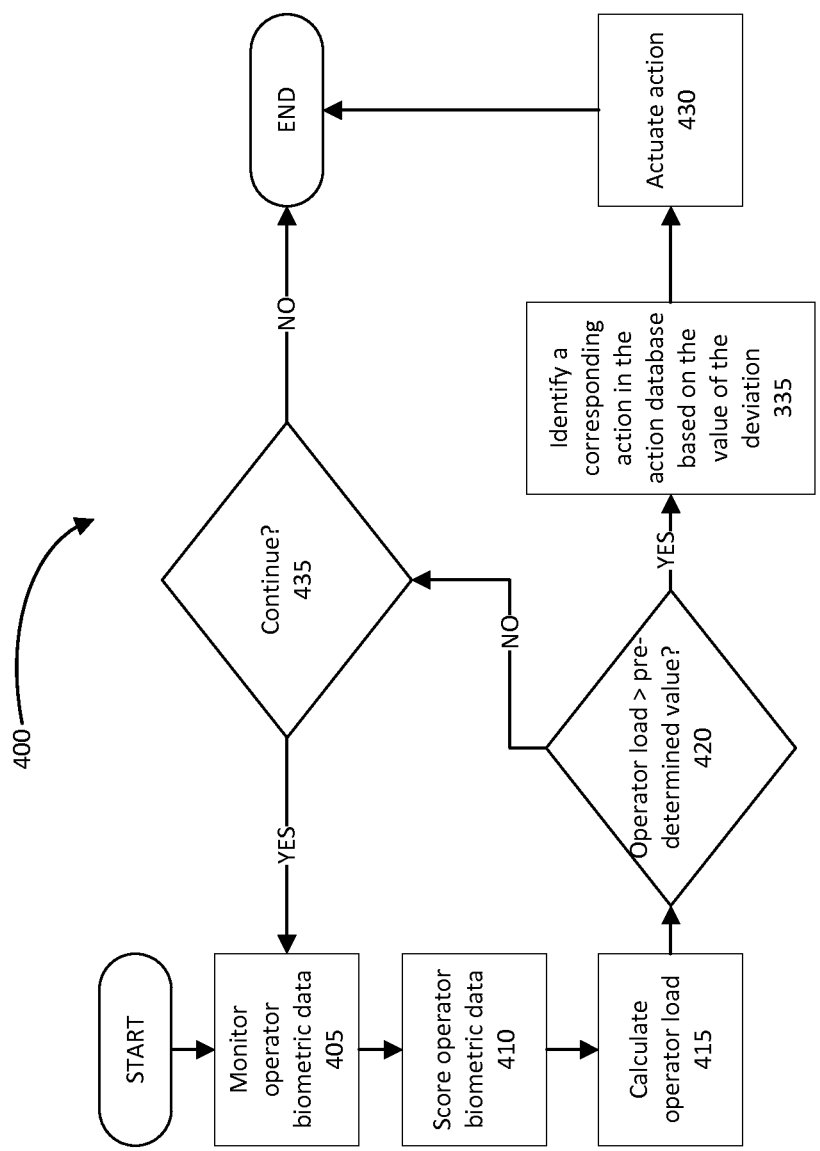
FIG. 4 is a second diagram of an exemplary process for detecting and preventing an incapacitated operator from operating a vehicle.

FIG. 4 is a diagram of a second exemplary process 400 for detecting and preventing an incapacitated operator from operating the vehicle 101.

The process 400 begins in a block 405. In the block 405, a plurality of biometric sensors 150, e.g., disposed within the vehicle 101 and/or the wearable device 135, monitors body characteristics (BC) of the operator. The measured body characteristics may include, for example, a heart rate, a pupillary size, a blink rate, and/or a respiration rate of the operator as an indication of operator incapacity. For example, decreased heart rate, stable pupil size, and decreased respiration rate of the operator may indicate that the operator is drowsy, tired, sleepy, etc. Additionally, increased heart rate, pupillary dilation, and increased respiration rate of the operator may indicate that the operator is stressed. The biometric sensors 150 may measure any other suitable body characteristic of the operator, such as eye movement, i.e., gaze detection, etc.

The wearable device 135 or the vehicle 101 HMI 120 may also prompt the operator to input personal data that may be used to assess operator capacity/incapacity. For example, the wearable device 135 or the vehicle 101 HMI 120 may prompt the operator to enter a number of hours of sleep the operator has had in the past 24 hours.

Next, in a block 410, the data measured by the biometric sensor 150 is received and scored by the vehicle 101 computer 105 and/or by the wearable device 135 computer, as described above.

Next, in a block 415, vehicle 101 computer and/or the wearable device 135 computer determines an operator load score, as described above.

Next, in a block 420, the vehicle 101 computer 105, the server 140, and/or the wearable device 135 analyze the load score, calculated in the preceding block 315, and/or the component scores to determine whether the operator is incapacitated and/or to determine a degree to which the operator is incapacitated. The load and/or component scores may be compared to pre-determined values representative of operator incapacity, e.g., for an average operator, to determine whether the operator is incapacitated. For example, if the load score is above the pre-determined value, the operator may be considered incapacitated. Similarly, for further example, the higher the load score is relative to the pre-determined value, the greater the operator incapacity, i.e., the degree to which the operator is incapacitated. Should the process 400 determine that the operator is incapacitated and the degree to which the operator is incapacitated, the process 400 proceeds to a block 425. Otherwise, if the process 400 determines that the operator is not incapacitated the process 400 proceeds to a block 435.

In the block 425, the vehicle 101 computer 105, the server 140, and/or the wearable device 135 matches to the action database the degree, i.e., value, in which the operator is incapacitated. For example, an operator having a high degree of incapacity, e.g., a load is above a predetermined threshold, may correspond to an action in which the computer 105 takes control of some or all of the vehicle 101 components and/or operations. That is, an operator having a high degree of incapacity may effect in the computer 105 taking control of essential vehicle 101 functions, e.g., steering, braking, navigating, etc. On the other hand, an operator having a low degree of incapacity, e.g., a load below a second predetermined threshold, may effect in the computer 105 taking control of less essential vehicle 101 functions, e.g., use of lane assist, cruise control, etc., and/or alerting the operator, e.g., by sending an alert to the wearable device 135, the HMI 120, etc.

Additionally or alternatively, the computer 105 may deviate from the action in the action database corresponding to the operator load and/or adjust thresholds related to load, when certain environmental and vehicle 101 conditions are present. For example, in inclement weather, e.g., in rain, snow, fog, etc., and/or other conditions that could make a collision or other accident more likely, e.g., traveling at high speeds, in traffic, etc., the computer 105 may take more control of the vehicle 101 components and/or operations than it might otherwise at a particular operator load, e.g., degree of operator incapacity. For example, the computer 105 may take greater control of the vehicle 101 components and/or operations when operator visibility is reduced in fog or when stimulus response time for the operator is low at high speed and/or in traffic. Greater or more control could mean taking control of more components, e.g., at a level of operator load, means the computer 105 could be programmed to take control of vehicle 101 braking, but the computer 105 could be further programmed to additionally take control of vehicle 101 steering at that level of operator load given certain environmental conditions, e.g., presence of rain or snow. Greater or more control could alternatively or additionally mean taking control of a greater degree of a component's operations, e.g., assisting or controlling all braking as opposed to controlling braking only when an obstacle is within a predetermined distance.

Next, in a block 430, the vehicle 101 computer 105 and/or the smart device 135 actuates the action in the action database or the action modified due to environmental and vehicle 101 data, as described above.

Next or following from the block 420, in the block 435, the vehicle 101 computer 105 determines whether the process 400 should continue. For example, the process 400 may end if the vehicle 101 turns off the process 400, if the vehicle 101 is switched off, etc. In any case, if the process 400 should not continue the process 400 ends following the block 435. Otherwise, the process 400 returns to the block 405.

Additionally, after the computer 105 takes control of some or all of the vehicle 101 components and/or operations during either the process 300 or the process 400, the vehicle 101 computer 105 and/or the wearable device 135 may determine that the operator has regained capacity. The computer 105 may subsequently return control of some or all of the vehicle 101 components and/or operations over which the computer 105 attained control. The process 300 and the process 400 thereafter could return to the block 305 and the block 405, respectively.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a vehicle computer comprising a processor and a memory, the memory storing instructions executable by the processor such that the computer is programmed to:
receive, from a wearable device, biometric data concerning a vehicle operator measured by at least one sensor in the wearable device;
determine, based at least in part on the biometric data from the wearable device, a load score that is a measurement of operator capacity to operate the vehicle;
determine a deviation of the load score from a baseline;
modify the deviation based on environmental data;
match the modified deviation to a vehicle action in an action database; and
actuate at least one vehicle component according to the action.

2. The system of claim 1, wherein the vehicle computer is further programmed to determine the load score based at least in part on data from at least one of a vehicle sensor and a vehicle communications bus.

3. The system of claim 1, wherein the vehicle computer is further programmed to determine to actuate the at least one vehicle component based at least in part on data from a vehicle communications bus.

4. The system of claim 1, wherein the vehicle computer is further programmed to determine the load score based at least in part on one or more previously determined load scores.

5. The system of claim 1, wherein the vehicle computer is further programmed to receive personal data input by the operator.

6. The system of claim 1, wherein at least one of the wearable device and the vehicle computer is further programmed to provide an alert based at least partly on the load score.

7. The system of claim 6, wherein the vehicle computer is further programmed to provide the alert to the wearable device.

8. The system of claim 1, wherein the vehicle is further programmed to prompt the operator for input and to use the input in at least one of the determination of the load score and the actuation of the at least one vehicle component.

9. The system of claim 1, wherein the biometric data includes at least one of a heart rate monitor, a respiratory monitor, and a pupil size and stability monitor for measuring the biometric data received by the vehicle computer.

10. The system of claim 1, wherein the computer is further programmed to receive the biometric data from at least one vehicle sensor in addition to the wearable device.

11. A method, comprising:
receiving, from a wearable device, biometric data concerning a vehicle operator measured by at least one sensor in the wearable device;
determining a load score that is a measurement of operator capacity to operate the vehicle based at least in part on the biometric data from the wearable device; and
determining a deviation of the load score from a baseline;
modifying the deviation based on environmental data;
matching the modified deviation to a vehicle action in an action database; and
actuating at least one vehicle component according to the action.

12. The method of claim 11, further comprising determining the load score based at least in part on data from at least one of a vehicle sensor and a vehicle communications bus.

13. The method of claim 11, further comprising actuating the at least one vehicle component based at least in part on data from at least one of a vehicle sensor and a vehicle communications bus.

14. The method of claim 11, further comprising determining to actuate the at least one vehicle component based on one or more previously determined load scores.

15. The method of claim 11, further comprising receiving personal data input by the operator.

16. The method of claim 11, further comprising providing an alert based at least partly on the load score.

17. The method of claim 11, wherein the vehicle computer prompts the operator for input on at least one of the determination of the load score and the actuation of the at least one vehicle component.

18. The method of claim 11, wherein the biometric data includes at least one of a heart rate monitor, a respiratory monitor, and a pupil size and stability monitor for measuring the biometric data received by the vehicle computer.

19. The method of claim 11, further comprising receiving the biometric data from at least one vehicle sensor in addition to the wearable device.

* * * * *